United States Patent [19]
Arditti et al.

[11] Patent Number: 5,991,413
[45] Date of Patent: Nov. 23, 1999

[54] PROCESS FOR THE ACCEPTANCE OF A VIRTUAL PREPAID CARD USE REQUEST PERMITTING THE REUSE OF ITS SERIAL NUMBER

[75] Inventors: David Arditti, Clamart; Olivier Boulot, Versailles; Mireille Campana, Clamart; Sophie Milano, Paris, all of France

[73] Assignee: France Telecom, Paris, France

[21] Appl. No.: 08/873,653

[22] Filed: Jun. 12, 1997

[30] Foreign Application Priority Data

Jun. 21, 1996 [FR] France .................................. 96 07762

[51] Int. Cl.$^6$ ............................... H04L 9/32; G07F 7/08
[52] U.S. Cl. ................................. 380/25; 380/23; 380/24; 380/49; 380/50; 235/379; 235/380; 235/381; 379/111; 379/112; 379/114; 379/143; 379/144
[58] Field of Search .................... 705/1, 14; 235/379, 235/380, 487, 493, 494, 492, 381, 382, 382.5; 379/111, 114, 143, 144, 154, 155, 112, 113; 380/4, 23, 24, 25, 49, 50, 59

[56] References Cited

U.S. PATENT DOCUMENTS

| | | | |
|---|---|---|---|
| 4,706,275 | 11/1987 | Kamil | 379/144 |
| 4,725,719 | 2/1988 | Oncken et al. . | |
| 5,264,689 | 11/1993 | Maes et al. | 235/492 |
| 5,409,092 | 4/1995 | Itako et al. | 235/381 X |
| 5,719,926 | 2/1998 | Hill | 379/113 |
| 5,825,863 | 10/1998 | Walker | 379/144 |

FOREIGN PATENT DOCUMENTS

| | | |
|---|---|---|
| 224147 | 6/1987 | European Pat. Off. . |
| 429176 | 5/1991 | European Pat. Off. . |
| 671712 | 9/1995 | European Pat. Off. . |
| 2685520 | 6/1993 | France . |
| 3432557 | 3/1986 | Germany . |
| 4311561 | 10/1994 | Germany . |
| 94/16415 | 7/1994 | WIPO . |
| 95/34161 | 12/1995 | WIPO . |

*Primary Examiner*—Bernarr E. Gregory
*Attorney, Agent, or Firm*—Pearne, Gordon, McCoy & Granger LLP

[57] ABSTRACT

The present invention relates to a process for accepting a request for use of a virtual prepaid card involving the following stages:
a user of a virtual prepaid card is connected to a server containing a data base, particularly version numbers, which are incremented when the corresponding cards are empty or obsolete,
said user is authenticated with the server by communicating thereto an authentication sequence and a version number,
said server supplies these numbers to a security processor having the capacity to recalculate the authentication sequence and check the validity thereof,
in the case of the validity thereof, the processor transmits to the server a consumption authorization,
after receiving said authorization the server gives agreement to the use request, within the limits of the credit remaining on the card and the validity date of the latter.

8 Claims, 3 Drawing Sheets

PROCESS FOR THE ACCEPTANCE OF A VIRTUAL PREPAID CARD USE REQUEST PERMITTING THE REUSE OF ITS SERIAL NUMBER

TECHNICAL FIELD

The present invention relates to a process for the acceptance of a use request for a virtual prepaid card permitting the reuse of its serial number.

PRIOR ART

General.

A prepaid card enables its holder to receive a service from a service supplier, the payment for this service taking place beforehand at the time of purchase of the card.

A distinction must be made between the virtual prepaid card and the non-virtual prepaid card. In the first case, all the features of the card and in particular its credit are controlled by a centralized server. In the second case, such informations are contained by the card. The Télécarte, which is used in the France Telecom public telephone network, is an example of a non-virtual prepaid card.

The invention only relates to virtual prepaid cards. Unlike in the case of non-virtual prepaid cards, which are necessarily constituted by a material device, virtual prepaid cards can be of two types:

immaterial, virtual prepaid cards constituted by a simple number, material, virtual prepaid cards, which are constituted by a physical device, e.g. a phone card.

The architecture of a system operating on the principle of virtual prepaid cards is illustrated in FIG. 1, where the following operations occur:

1. sale of a virtual prepaid card,
2. authentication of the virtual prepaid card,
3. knowledge of the remaining credit and other parameters of the virtual prepaid card,
4. supply of a service,
5. dialogue enabling the service supplier to update the credit of the virtual prepaid card.

Life phase of a prepaid card.

Thus, a distinction is made between several phases in the life of a virtual prepaid card.

Purchase

The user purchases from a distributor a virtual prepaid card. It is initially credited with a certain number of units corresponding to its purchase price. One unit makes it possible to pay for an indivisible part of a service. This can in general terms be a monetary unit and in the case of a telephone service a basic charge, or one minute of communication or any other fraction of a service. In certain cases the credit of a certain number of units can be offered by an advertiser in the form of a publicity program.

The control of the virtual prepaid card is in the hands of a data processing server, whose function is to update the credit of the card, as well as certain complimentary data (validity dates, payment stoppage, etc.).

Use

In order to obtain a service from the service supplier, the user must firstly prove that he is in possession of a virtual prepaid card for which the server authenticates the card. This authentication function consists of checking the validity of an authentication sequence of symbols which is transmitted to the server:

for immaterial, virtual prepaid cards, this sequence is the card number, or any other fixed identifying means which the holder communicates to the server, for material, virtual prepaid cards, for each activation by its holder, a different sequence of symbols is cryptographically calculated by the physical device and can transmit it to the server or may only communicate it to the holder, who himself transmits it, which forms a reliable authentication method, as a result of their ergonomic interest, it would also be possible to conceive material, virtual prepaid cards emitting sequences of fixed symbols, which are simpler to use than immaterial, virtual prepaid cards, but less reliable than material, prepaid cards.

If the authentication of the virtual prepaid card is successful, the server indicates to the service supplier the credit remaining on the card of the user. Optionally, this information can be transmitted to the user.

By addressing the server, the service supplier can then debit the account of the user as a function of the service rendered. This debit can take place either prior to the supply of the service, or during the supply of the service, or once the supply has been rendered, or by a combination of these different processes.

The end of the virtual prepaid card.

The virtual prepaid card becomes unusable when its validity date is exceeded or when its credit is exhausted. It is then possible to attempt to reuse the number of the virtual prepaid card.

Authentication principles.

The sequence of symbols enabling the user to authenticate himself is called the "authentication sequence", its constitution depending on the type of virtual prepaid card.

Immaterial, virtual prepaid cards or material, virtual prepaid cards emitting fixed sequences (case 1 hereinafter)

The authentication sequence is constituted by a "serial number", which locates the card in the server data base and a "certificate" guaranteeing the authenticity of said card.

In certain cases the certificate is calculated by the application of a "cryptographic algorithm" to the serial number and to a secret key (called the mother key), which only the service provider knows.

Material, virtual prepaid cards emitting different sequences for each use (case 2 hereinafter)

The authentication sequence is constituted by a "serial number" for locating the card in the server data base and an "authenticator", which differs for each use of the card and guaranteeing the authenticity thereof.

The material, virtual prepaid card calculates the authenticator by the application of a "cryptographic algorithm" to a variable element and to a secret key individual to the material, virtual prepaid card and known as the "daughter key". The variable element is either a counter incremented for each use of the card, or a quantity encoding the time and date.

The secret key individual to the material, virtual prepaid card (daughter key) is introduced into the latter by the service provider, or by someone in whom said provider has confidence, at the time of the "personalization" of said card. In certain cases the daughter key is calculated by the application of a "cryptographic algorithm" to the serial number and to a secret key called the "mother key" which only the service provider knows. This mother key→daughter key derivation is called "diversification".

Prior art devices.

In the prior art devices, when the user wishes to benefit from the possibilities of his virtual prepaid card, he must communicate the authentication sequence to the server, e.g. by means of a telephone keypad or dial for each communication request. The latter must not be too long so that the manipulation to be carried out by the user is not excessively tiresome. However, there is a rapid increase in the number of prepaid cards, which could be distributed on a massive scale as promotional objects, e.g. associated with a purchase. For comparison purposes, several tens of millions of Télé-cartes are sold every year.

Thus, the length of these serial numbers will increase in parallel and the user may have to dial more and more digits for each connection request, apart from the server number and the subscriber number, which would be very tiresome.

Among the prior art publications, document [1] at the end of the present description describes equipments making it possible to emit authentication sequences constituted by a serial number and a time-variable sequence calculated by a cryptographic process. None of these documents describes the reuse of serial numbers.

The object of the present invention is to permit a reuse of serial numbers of prepaid cards associated with zero credits or exceeded validity dates, i.e. to reuse empty or obsolete cards. It is not a question of permitting a reloading of prepaid cards, an empty card remaining definitively obsolete for its user, but instead allows the allocation of their numbers to new cards.

DESCRIPTION OF THE INVENTION

The present invention relates to a process for the acceptance of a use request of a virtual prepaid card permitting the reuse of serial numbers and involving the following stages:

a user of a prepaid card is connected to a server containing a serial number data base used for locating prepaid cards, credits remaining to be consumed and validity dates of said cards, the user is authenticated with the server by communicating thereto an authentication sequence constituted by:
 either (case 1) a serial number and a certificate (immaterial, virtual prepaid cards or material, virtual prepaid cards emitting fixed sequences),
 or (case 2) a serial number and authenticator (immaterial, virtual prepaid cards emitting different sequences for each use), said server supplies the sequence received to a security processor having the capacity to check the validity of said sequence, in the case of validity of said sequence, the processor transmits to the server a consumption authorization, after receiving said authorization the server gives agreement to the use request within the credit limits remaining on the card and the validity date of the latter.

This process is characterized in that during a use request the server supplies the security processor with, apart from the certificate or authenticator (authentication sequence), a version number associated with each card, which is incremented when the card is empty or obsolete and which is stored in the server data base, and in that said processor recalculates the certificate or authenticator, which is dependent on the version number, prior to checking its validity.

Although having the same serial number, the old virtual prepaid card can consequently no longer be used because its certificate or secret key is different from the certificate or secret key of the new virtual prepaid card. Thus, the version number which has changed intervenes in the calculation of the certificate or secret key.

In an advantageous application the prepaid card is a prepaid phone card, the use request then being that of a phone connection.

Thus, the process according to the invention makes it possible to reliably issue a new card corresponding to an already allocated serial number and permits the distinction to be made between said card and its preceding version, the authentication sequence being by design different from that of the preceding version, because their version number differs.

Thus, the authentication sequence length is dependent on the number of cards valid and not the total number of cards already issued. Therefore the process of the invention keeps constant or within acceptable limits the size of the authentication sequence.

DETAILED DESCRIPTION OF EMBODIMENTS

Figure 1:
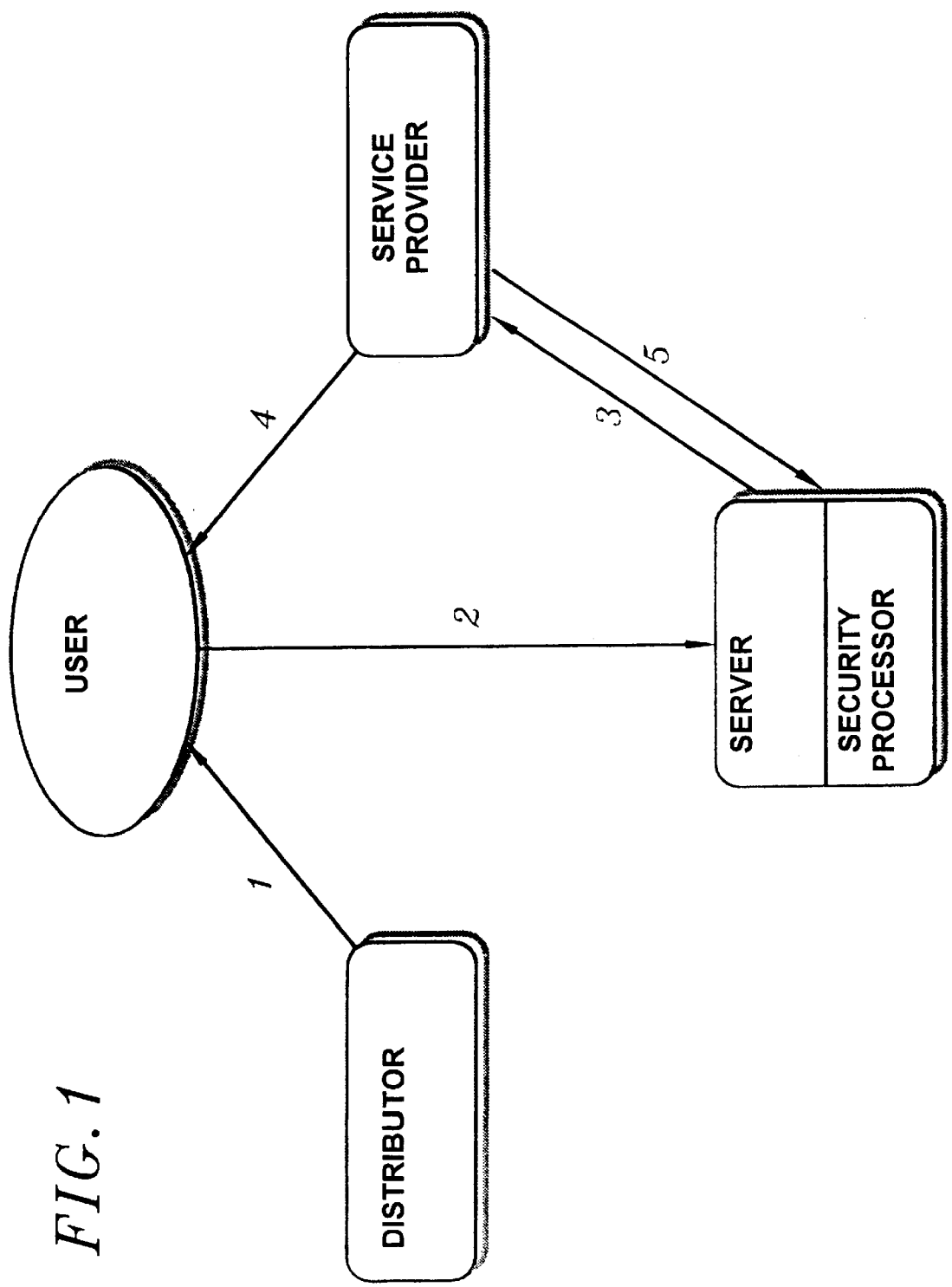
FIG. 1 diagrammatically illustrates a communications system in which use is made of the process of the invention.

In the system shown in FIG. 1, a terminal available to the user can be connected to the server, e.g. by a telephone link, whereby said server can itself communicate with the security processor. This server contains a data base of serial numbers of prepaid cards, credits remaining to be consumed thereon and their validity dates.

In order to be able to accept a prepaid card use request, the prepaid card user CCP is connected to the server, which requests an authorization from the security processor. In the case of agreement, this use request is accepted. This can e.g. be the agreement to a communication with another terminal.

In the process according to the invention with each prepaid card is associated a "version" number stored in the server data base. This number is not stored in the card, which would lengthen the sequence to be reentered. The associated authentication sequence is dependent on said version number, which is incremented when the card is empty or obsolete. It is therefore impossible for a user holding an empty or obsolete card to reuse his card number, even if the serial number of said card corresponds to a new positive credit, because the sequence has been modified.

For each card the server data base contains the following informations: serial number, version number, new credit and new validity date. The data base is such that it makes it possible to again find these informations on the basis of the serial number. The version number is only present in the server.

During a use request, the server supplies to the security processor the serial number, version number and authentication sequence (certificate or authenticator). This security processor recalculates said sequence (certificate or authenticator) and, as hereinbefore, gives connection agreement to the user if said sequence is valid. It should be noted that no base is stored in the security processor.

In the prepaid card use request acceptance process according to the invention, the following stages arise:
a user of a prepaid card is connected to a server containing a serial number data base used for locating prepaid cards, remaining credits to be consumed, validity dates of said cards, as well as version numbers associated with each card, which are incremented when the corresponding cards are empty or obsolete, this user undergoes authentication from the server by communicating thereto an authentication sequence constituted by:

either (case 1) a serial number and a certificate (immaterial, virtual prepaid cards or material, virtual prepaids cards emitting fixed sequences), or (case 2) a serial number and an authenticator (immaterial, virtual prepaid cards emitting different sequences for each use), the server finds the version number again on the basis of the serial number, said server supplies the authentication sequence and said version number to a security processor having the capacity to recalculate the sequence and which is dependent on the version number and checks the validity thereof, in the case of sequence validity, said processor transmits a consumption authorization to the server, after receiving said authorization the server gives its agreement to the use request, within the limits of the remaining credit on the card and the validity date thereof.

Advantageously, the process is such that:

in the case 1 the certificate is calculated by the application of a "cryptographic algorithm" to the serial number, to the version number and to a secret mother key, in case 2, the secret daughter key is calculated by the application of a "cryptographic algorithm" to the serial number, to the version number and to the secret mother key, it being said daughter key which makes it possible to calculate the authenticator, as has been explained hereinbefore.

The process according to the invention functions in the following way.

a) Initially the version number stored in the server data base is zero.

b) The calculation of the certificate or secret daughter key takes place during the creation of a virtual prepaid card. Thus, formation takes place of the fixed authentication symbol sequence in case 1 or, in case 2, the secret daughter key, which will be introduced into the material, virtual prepaid card.

c) Then for each use the version number of the virtual prepaid card, which is stored in the server data base is communicated to the security processor, which checks the certificate (case 1) or the authenticator (case 2). In case 2, the security processor must calculate beforehand the secret daughter key necessary for the checking of the authenticator.

d) When the card is no longer valid (credit exhausted or validity date exceeded), as in b) it is possible to create a new virtual prepaid card having the same serial number by incrementing the version number. The new virtual prepaid card will be used as in c).

Although having the same serial number the old virtual prepaid card will no longer be usable, because its certificate or secret key is different from the certificate or secret key of the new virtual prepaid card. Thus, the changed version number intervenes in the calculation of the certificate or secret key.

The process according to the invention makes it possible to accept a use request, which can e.g. be that for the connection of a service, e.g. an after sales service, that of a purchase, either in remote or non-remote form, and finally that of a phone connection.

The links between the user, server and processor can be telephone links, but can also be any other type of link, e.g. of the computer type (e.g. Internet).

Figure 2:
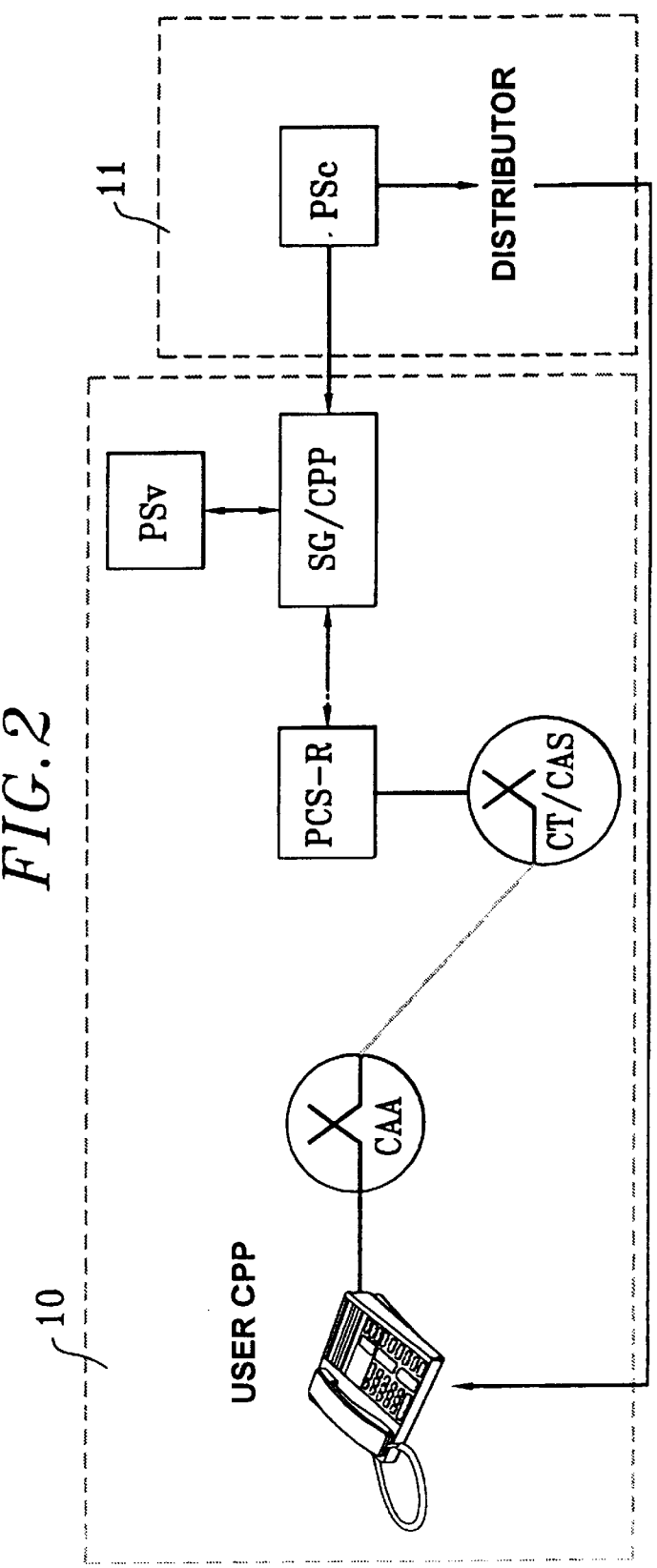
FIG. 2 illustrates an example of the operation of the process according to the invention in the intelligent France Télécom network.

FIG. 2 gives an example of the use of the prepaid card in the intelligent France Télécom network. In FIG. 2 the following abbreviations are used:

| | |
|---|---|
| CPP | prepaid card |
| CAA | center with routing autonomy |
| CT/CAS | transit center with service access switching function |
| PCS-R | network services control point |
| SG/CPP | prepaid card control system |
| PSv | prepaid card checking security processor |
| PSc | prepaid card creation security processor. |

Block 10 illustrates the real time data flow between user and server. Block 11 illustrates the delayed time, prepaid card creation procedure.

Module SG/CPP, which corresponds to the server of FIG. 1, contains the data base of serial numbers of prepaid cards, credits remaining thereon, as well as their validity dates and the version numbers.

Module PSv corresponds to the security processor of FIG. 1. Modules CAA and CT/CAS form part of the France Telecom network.

The user presents his card number and via CAA—CT/CAS—PCS-R reaches SG/CPP which, after consulting the data base and PSv, gives its agreement for supplying the requested service.

Figure 3:
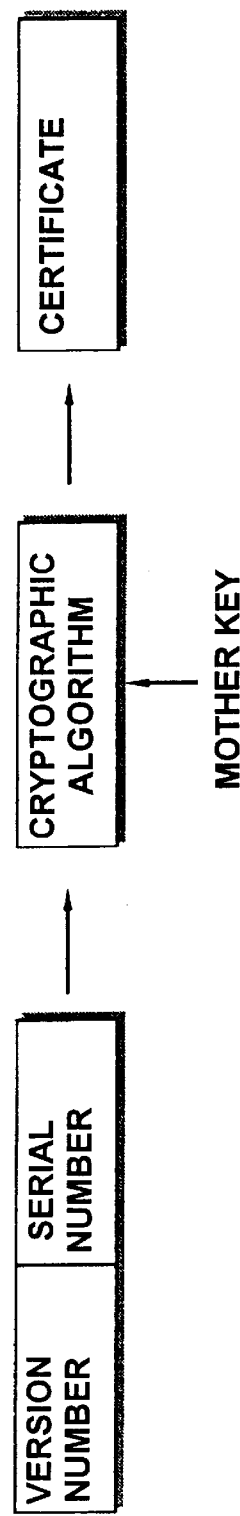
FIG. 3 illustrates the reuse of a fixed sequence prepaid card in accordance with the process of the invention.

FIG. 3 is a diagram describing the reuse of a prepaid card with the recalculation of the certificate corresponding to a card, starting with serial and version numbers and using a cryptographic algorithm employing a calculation key known as the mother key, which is described in document [2].

Figure 4A:
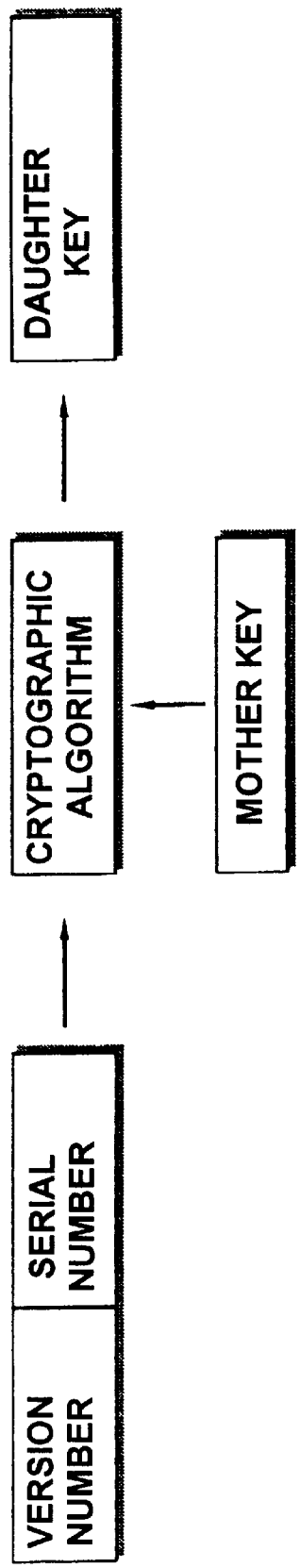
FIGS. 4A and 4B illustrate the case of material, virtual prepaid cards emitting a variable sequence.
Figure 4B:
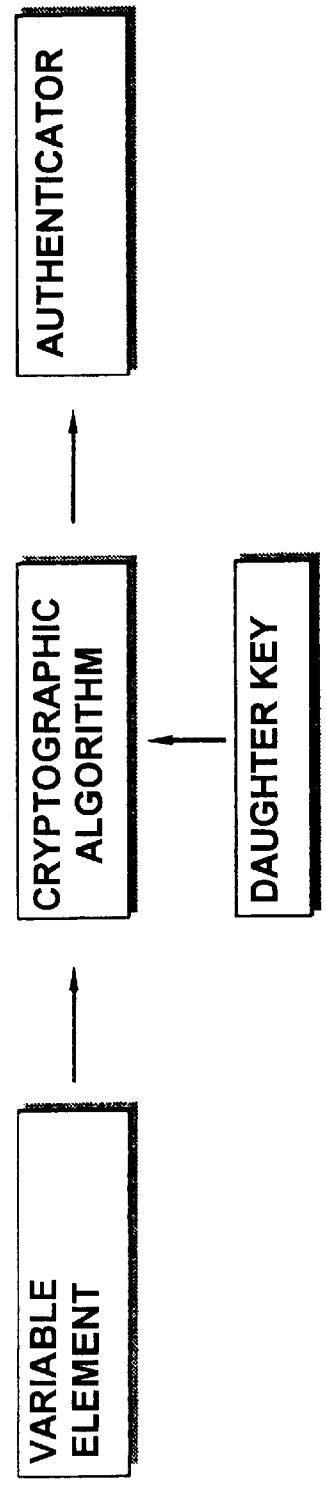

In the case of material, virtual prepaid cards emitting a variable sequence:

FIG. 4A illustrates the calculation by cryptographic algorithm of the daughter key from the serial number, the version number and the mother key, FIG. 4B illustrates the calculation by cryptographic algorithm of the authenticator from the variable element and the daughter key.

REFERENCES

[1] U.S. Pat. No. 4,601,011 (GRYNBERG)
[2] "Applied Cryptography" by Bruce Schneir (John Wiley & Son, second edition, part 3, chapter 3, ("Data Encryption Standard"), chapter 13, ("Other Block Ciphers"), pages 265 to 328).

We claim:

1. Process for the acceptance of a use request of a virtual prepaid card permitting reuse of serial numbers, involving the following stages:

a user of a virtual prepaid card is connected to a server containing a data base of serial numbers used for identifying prepaid cards, remaining credits to be consumed and validity dates of said cards, said user obtains authentication from the server by communicating thereto an authentication sequence, said server supplies said sequence to a security processor that checks the validity thereof, in the case of the validity thereof, the processor transmits a consumption authorization to the server, after receiving said authorization, the server gives its agreement to the use request, within the credit limits remaining on the card and the validity date thereof, wherein during a use request, the server supplies the security processor with, besides the authentication sequence, a version number associated with each card, which is incremented when the card is empty or obsolete and which is stored in the server data base and wherein said processor recalculates the authentication sequence, which is dependent on the version number, prior to checking its validity.

2. Process according to claim 1, wherein the authentication sequence is fixed and constituted by a serial number and a certificate.

3. Process according to claim 2, wherein the certificate is calculated by applying a cryptographic algorithm to the serial number, to the version number and to a secret mother key.

4. Process according to claim 2, wherein the version number stored in the server data base is initially zero and further comprising the steps of:

a) creating a virtual prepaid card, wherein the certificate is calculated during said creation of the card so as to form the fixed authentication sequence to be introduced into a material, virtual prepaid card, b) for each use of the card, communicating to the security processor the version number of the virtual prepaid card stored in the server data base and the security processor checking the certificate, and c) after the virtual card is empty or obsolete, repeating step a) to create a new virtual card having a same serial number by incrementing the version number and repeating step b) for the new card.

5. Process according to claim 1, wherein the authentication sequence is variable and constituted by a serial number and an authenticator.

6. Process according to claim 5, wherein a secret daughter key, which makes it possible to calculate the authenticator, is calculated by applying a cryptographic algorithm to the serial number, to the version number and to a secret mother key.

7. Process according to claim 6, wherein the version number stored in the server data base is initially zero and further comprising the steps of:

a) creating a virtual prepaid card, wherein the secret daughter key is calculated during said creation of the card so as to form the secret daughter key to be introduced into a material, virtual prepaid card, b) for each use of the card, communicating to the security processor the version number of the virtual prepaid card stored in the server data base and the security processor calculating the secret daughter key and then checking the authenticator, and c) after the virtual card is empty or obsolete, repeating step a) to create a new virtual card having a same serial number by incrementing the version number and repeating step b) for the new card.

8. Process according to claim 1, wherein the prepaid card is a prepaid phone card and wherein the use request is that of a phone connection.

* * * * *